Sept. 25, 1923. 1,468,809
W. H. HERMANN
TIRE BUILDING MACHINE
Filed Aug. 9, 1920 2 Sheets-Sheet 1

Inventor
Walter H. Hermann,
By
Attorneys

Sept. 25, 1923.                W. H. HERMANN                1,468,809
                           TIRE BUILDING MACHINE
                       Filed Aug. 9, 1920        2 Sheets-Sheet 2
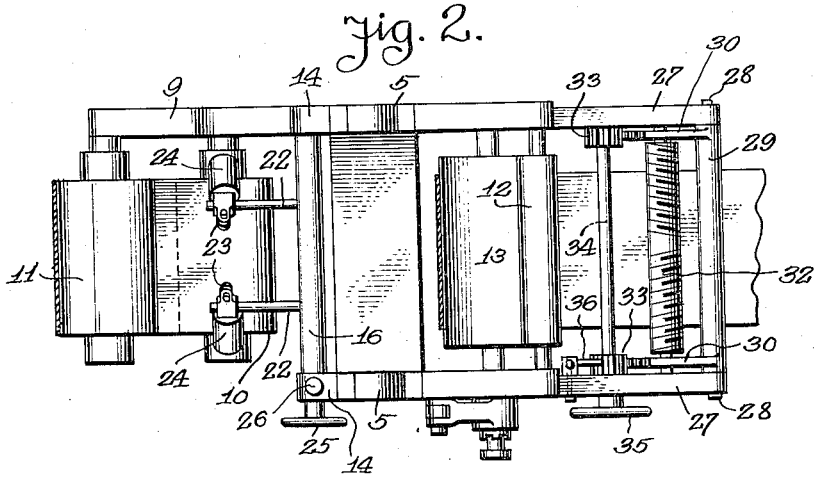
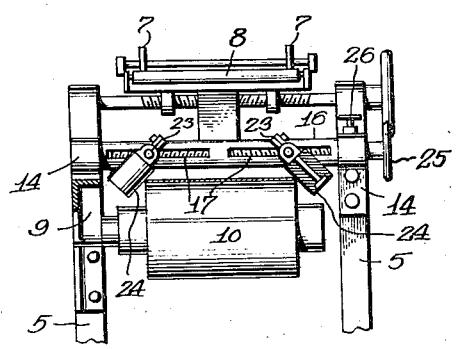
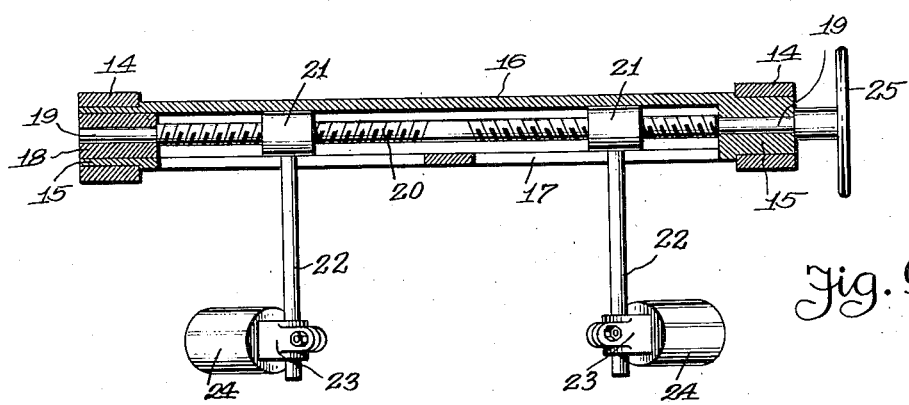
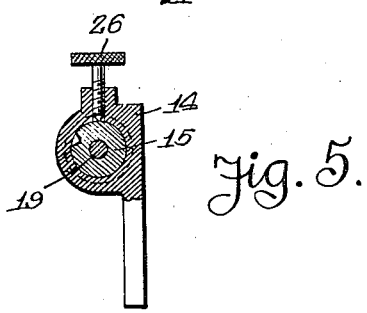
Inventor
Walter H. Hermann,
By
Attorneys Patented Sept. 25, 1923.

1,468,809

UNITED STATES PATENT OFFICE.

WALTER H. HERMANN, OF COLUMBUS, OHIO.

TIRE-BUILDING MACHINE.

Application filed August 9, 1920. Serial No. 402,471.

*To all whom it may concern:*

Be it known that I, WALTER H. HERMANN, a citizen of the United States of America, residing at Columbus, in the county of Franklin and State of Ohio, have invented certain new and useful Improvements in Tire-Building Machines, of which the following is a specification, reference being had therein to the accompanying drawings.

In my pending application filed Dec. 26, 1918, Ser. No. 268,402, there is disclosed a stationary tire building machine, which includes multiple stock holders, tension rolls, and guiding and tensioning devices for fabric removed from the stock holders over the rolls for application to a tire core or tire body in the course of construction.

This invention has special reference to guiding and tensioning means of fabric and one of the objects of this invention is to provide novel centering means for a strip of fabric as it is unwound from a roll, such means permitting of a multiplicity of strips properly merging for application to a core or tire body under construction. This permits of different widths of fabric being maintained in separate rolls, in contradistinction to a single roll, and obviates the necessity of shifting the fabric as applied to a tire body.

Another object of this invention is to provide a spreader roll adjusting means which smooths the fabric on the case or tire body, and is adjustable to the various sizes of cores or bodies. The adjustability of the spreader roll also facilitates the building of the tire and contributes to fabric economy. Other objects are also attained by certain improvements that will hereinafter appear, and reference will now be had to the drawings, wherein Figure 1 is a side elevation of the machine provided with my improvements;

Fig. 2 is a plan of the same;

Fig. 3 is a vertical cross sectional view of a portion of the machine taken on the line III—III of Fig. 1;

Fig. 4 is an enlarged longitudinal sectional view of a fabric centering device, and Fig. 5 is a cross sectional view of a portion of the same.

Figure 1:
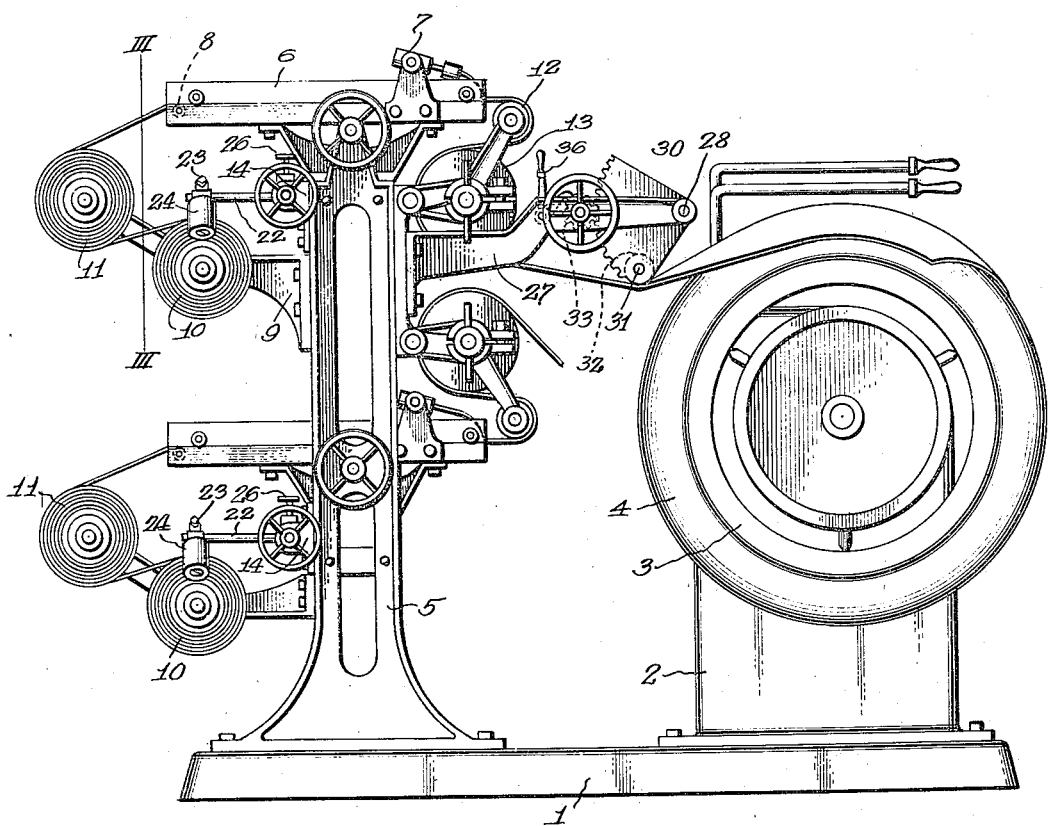

The tire building machine to which my improvements are applicable, comprises a base 1 for a support 2 having a rotary collapsible core 3 on which is fabricated a tire body 4.

On the base 1 are uprights 5 supporting superposed adjustable platens or guide tables 6 provided with marking devices 7 and suitable guide rollers 8 so that fabric may be guided in its movement over the table.

At the rear side of the machine there are brackets 9 supporting stock rolls 10 and take-up rolls 11, the latter receiving the usual strips of non-adhesive material which are sandwiched between the convolutions of the adhesive stock; the non-adhesive strips being wound on the take-up rolls as the adhesive material is unwound from the stock rolls.

At the front side of the machine there are guide rollers 12 and tension rollers 13 which cooperate with the guide rollers 12 in guiding fabric from the table 6 to the core 3. My first improvement is associated with the stock rolls 10 and the upright 5 are provided with a set of brackets 14 adjacent the brackets 9. In the brackets 14 are journaled the reduced ends 15 of a tube 16 having longitudinal slots 17. In one end of the tube 16 is a bearing 18 which cooperates with the opposite end of the tube 16 in supporting the spindles 19 of a double screw 20, said screw having two sets of screw threads with one set right hand threads and the other left hand threads, as shown in Fig. 4. On this double screw are nuts 21 provided with arms 22 protruding through the slots 17 and outwardly from the tube 16. On the outer ends of the arms 22 are adjustable clamps 23 supporting revolvable guide rollers 24. The clamps 23 can be adjusted longitudinally of the arms 22 and also swung about said arms as an axis and fixed so that the rollers 24 will be disposed at a desired angle.

One of the spindles 19 is provided with a hand wheel 25 to permit of the double screw 20 being rotated to move the arms 22 to and from each other, and one of the brackets 14 is provided with a set screw 26 to engage in the reduced end of the tube 16 and hold said tube relative to the brackets and with the slots 17 facing in a desired direction.

The adjustment of the arms 22 attained by the screw 20 permits of the arms being separated so as to be positioned in proximity to the end of the stock roll 10. The rollers 24 can then be shifted on the arms 22 and positioned at an angle to engage the edges of the stock roll and center said stock roll on its supporting spindle or arbor. The rollers 24 are positioned at diverging angles, as best shown in Fig. 3 and when engaging the end edges of a roll it is practically impossible for the roll to shift longitudinally of its supporting means, consequently the fabric on the roll will always be centered relative to the machine.

In operation the ends of the tube 16 are loose in the bracket 14 so that said tube may freely turn and permit the outer ends of the arms 22 to descend by gravity and consequently maintain the rollers 24 in engagement with the ends of the roll 10 as its diameter is gradually decreased by fabric removed therefrom. The set screw 26 is only employed to lock the tube 16 in a fixed position with the arms 22 swung upwardly out of the way so that a new stock roll may be substituted for one from which the fabric has been removed.

My second improvement is applied to the front side of the machine and comprises a set of brackets 27 having the outer ends thereof connected to a rod 28. Loose on the rod 28 is a sleeve or hub 29 having its ends provided with sector gears 30, and these sector gears are connected by a rod 31 on which is a rotatable spreader roller 32 having threaded portions. In lieu of the rod 31 the roller 32 may have pintles extending into anti-frictional bearings of the sector gears 30 and these sector gears mesh with pinions 33 on a shaft 34, journaled in the brackets 27. One end of the shaft 34 has a hand wheel 35 and one of the brackets 27 has a gravity pawl or locking device 36 engaging one of the pinions 33, so that after the sector gears 30 are adjusted to correctly position the spreader roll 32, said sector gears may be locked in such position by the gravity pawl 36.

By reference to Fig. 1 it will be observed that the spreader roller 32 is positioned common to the guide or tension rolls 13 and between said rollers and the core 3, so that fabric removed from the machine will pass under the tension roller on to the tire body 4 being fabricated on the core 3. The arc of contact between the fabric and the guide or tension rollers 13 and the tire body 4 may be increased or decreased by raising and lowering the spreader roller and in consequence of such adjustment the fabric is smoothed and conveyed on to the various sized cores in the same relative position.

The threaded portions of the spreader roller 32, which are in the form of right and left screw threads extending from the middle of the roller to the ends thereof, cause the fabric to be smoothed out and somewhat stretched, so that it may be evenly applied to a core or body.

When a machine is equipped with my two improvements it may be unnecessary to use some of the guiding and tensioning devices of my former machine, as in practice, I have found better results can be obtained by a machine equipped with these improvements than with the old machine. Since the improvements may be applicable to machines other than that type devised by me, I do not care to define my invention to the specific construction and arrangement of parts herein shown, other than defined by the appended claims.

What I claim is:—

1. A tire building machine having a stock roll, and angularly disposed rollers engaging by gravity the ends of the stock roll.

2. A tire building machine having a stock roll, arms movable to and from the ends of said roll, and adjustable rollers supported on said arms against said roll.

3. A tire building machine as characterized in claim 2, wherein a double threaded screw is adapted for adjusting said arms.

4. A tire building machine as characterized in claim 2, wherein the rollers are disposed at diverging angles and may be swung away from said roll.

5. A tire building machine having a stock roll, brackets adjacent said stock roll, a tube free to revolve in said brackets, adjustable arms supported from within said tube, rollers supported by said arms and engaging the ends of said roll, and means for fixing said tube in said bracket.

6. A tire building machine as characterized in claim 5, wherein additional means in said tube permits of said arms being moved to and from each other.

7. In a tire building machine wherein a stock roll is supported on a supporting spindle and capable of laterally shifting thereon: means engaging by gravity the ends of the stock roll to prevent lateral movement of the stock roll on its supporting spindle.

8. In a tire building machine wherein a stock roll is susceptible to lateral movement when stock is removed from said roll: means supported from a plane parallel to the axis of said roll normally producing a pressure against the ends of said stock roll to prevent excessive lateral movement of said stock roll and center it relative to said means.

9. A tire building machine as called for in claim 8, wherein said means may be adjusted for stock rolls of various lengths.

10. In a tire building machine wherein a stock roll is loosely supported and susceptible to lateral movement when stock is unwound from said roll: means supported adjacent said stock roll and constantly producing a pressure at the ends of said stock roll to center said stock roll in said tire building machine, said means being loosely supported and adapted to be swung out of the road when one stock roll is substituted for another.

In testimony whereof I affix my signature in presence of two witnesses.

WALTER H. HERMANN.

Witnesses:
   J. LAURENCE PORTER,
   M. E. DUNN.